July 30, 1963
F. L. SYRACUSE
3,099,593
METHOD OF PACKAGING AND APPLYING WALL
TILE AND WALL PANEL ADHESIVE
Filed Feb. 9, 1961
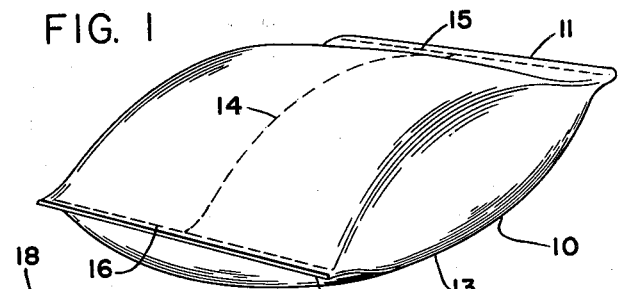
FIG. 1
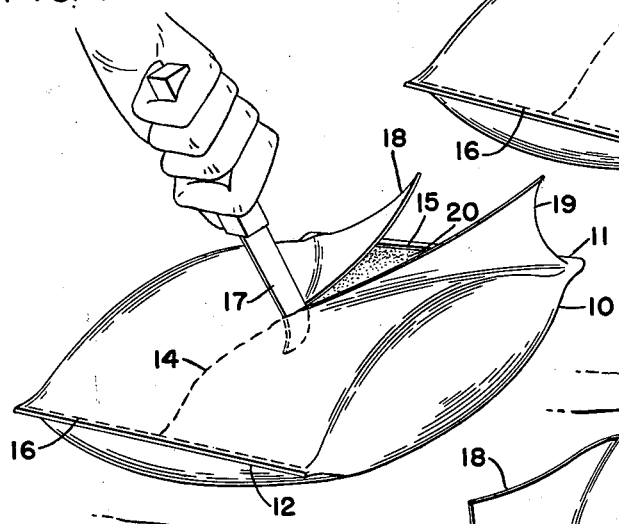
FIG. 2
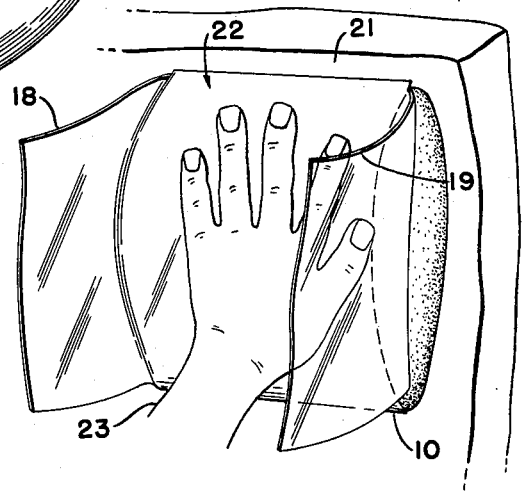
FIG. 3
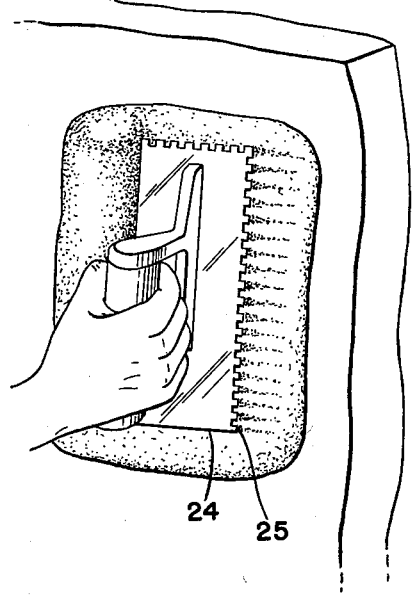
FIG. 4
FIG. 5
INVENTOR.
FELIX L. SYRACUSE
BY
*Fay & Fay*
ATTORNEYS 3,099,593
Patented July 30, 1963

3,099,593
METHOD OF PACKAGING AND APPLYING WALL TILE AND WALL PANEL ADHESIVE

Felix L. Syracuse, Shaker Heights, Ohio, assignor to The Macco Chemical Company, Wickliffe, Ohio, a corporation of Ohio
Substituted for abandoned application Ser. No. 601,455, Aug. 1, 1956. This application Feb. 9, 1961, Ser. No. 89,095
10 Claims. (Cl. 156—71)

This invention, relating as indicated to a method of packaging and applying wall tile and wall panel adhesive or mastic, is directed to a covering of polyethylene, or other enumerated polymer materials, to facilitate the transporting, storing, and dispensing of the package of adhesive or mastic.

This invention is further particularly directed to a method of applying the adhesive or mastic mass to a surface by means of the package.

In general, adhesive or mastic substances are being used to secure a variety of materials to a floor or wall. In connection with these wall surfaces, plastic, metal and ceramic tiles are being applied by means of oil, rubber, water or resin base mastics. These various adhesives are adapted to the particular tile material to be secured to the wall.

In connection with the packaging, storing and shipping of these adhesives, metal containers are frequently used, but such containers are often too large and must be resealed during use, or especially between periods of use, and it is cumbersome to remove the material therefrom. Prior to the development of this invention, it was necessary for one to open the container, dip therein to get the mastic or adhesive on a trowel, and then trowel the mastic onto the surface. Frequently there is a loss of mastic or adhesive material in connection with its removal from the cans. The material itself, if it is at all corrosive, often rusts the can, and hardening of the material within the containers is a problem encountered under most conditions.

Furthermore, repeated use of the mastic requires storing a container until reused. A smaller package of mastic, which would eliminate these problems and increase the ease with which the adhesive is taken from storage and placed on the building surface, would be desirable. This invention is directed to such a package of mastic for use by the professional as well as by the amateur do-it-yourself person.

This package involves a covering of pliable sealant film that could be composed of any of the group consisting of polyethylene, polyethylene terephthalate, polyester, cellulose acetate, a copolymer of polyvinylidene chloride with small amounts of polyvinyl chloride, laminates of these materials, or laminates with other materials, such as foil and the like, wherein one of the above composes the interior surface therein.

The package encompasses a glob or mass of perhaps 1 to 3 pounds of wall tile or wall panel adhesive of oil, rubber, water, or resin base. The pliable sealant film would cover all sides of the mass of adhesive or mastic and could have marks or indicia on the exterior surface thereof to facilitate cutting of the film covering and removal of flaps to expose one surface of the adhesive for securing it to the wall.

This package then provides a convenient method of applying the mastic or adhesive directly to the wall surface by a manual manipulation of the package without the operator contacting the adhesive per se. When the adhesive is thus applied to the wall and secured thereto by pressure, as indicated hereinafter, the sealant film could then be pulled from the other surface of the adhesive, even though there was considerable force in the pulling, because of the adherence of the mastic to the wall. The mastic could then be troweled to the surface.

It is an object of the invention to provide a method of easily applying the adhesive to a surface, particularly wall tile and wall panel, which consists of securing mastic within a pliable sealant container, cutting the package, removing the flaps, securing the glob of mastic to the wall by manipulating the package, removing the film, and troweling the mastic to the surface.

A still further object of this invention relates to a method by which a package of wall tile or wall panel adhesive is removed directly from storage and with a minimum amount of effort, as by cutting said package along certain indicia lines, the mastic is applied directly to a predetermined area of wall or building surface.

To the accomplishment of the foregoing and related ends, said invention then consists of the means hereinafter fully described and particularly pointed out in the claims. The following description sets forth in detail one approved method of carrying out the invention, such disclosed method, however, constituting but one of the various ways in which the principles of the invention may be used.

In the drawings:

FIG. 1 shows a perspective view of a package of wall tile or wall panel adhesive;

FIG. 2 shows a view of the package being opened;

FIG. 3 shows the application of the package to the wall, with the pliable sealant film removed from one face;

FIG. 4 shows the glob or mass of mastic or adhesive being troweled to the wall surface; and FIG. 5 shows an alternate version of the indicia or marking lines around the edge of the package to permit removal of a flap.

In general, this invention consists of a package having at least an interior layer of a pliable sealant plastic film. These films are thermoplastic and capable of being heat-sealed. They are strong and tenacious and very resistant to a great variety of reagents, both acids and bases, and particularly to corrosive materials.

In storing adhesives, either water, rubber, oil, or resin base, there are problems in connection with the corrosion of the container owing to the firm adhesion of the mastic to the walls of the container. Also, the shelf life of adhesives upon exposure to air is not great. The cans become warm and the adhesives harden on the surface, and, therefore, must be specially treated. In addition to this, there is a real need for smaller units that can be used conveniently by the householder when doing his own work, or by the tradesman. Further, there is loss of material by adhesion to the container walls even when they are coated in some manner. It is time-consuming to remove materials from the containers for application to the wall. To provide a better way of preventing loss of moisture from these materials and to overcome the above disadvantages, a smaller package could be used for one application, as over a segment of the wall area to be served, and then another container or package could be used at a later time. Thus, each package contains enough adhesive to cover successfully only a certain surface area of so many square feet so that there is no necessity for opening and closing of the container as in the past.

Polyethylene, cellulose acetate, etc. are feasible for such application because they are readily heat-sealable and will prevent absorption and/or loss of moisture. In addition, these films are resistant to reaction by the materials being sealed therein. The outer coating may be of other materials, such as paper or foils, i.e. aluminum foil, provided the interior sealant film layer together with the outer material has sufficient tenacity to withstand the usage in question.

In connection with the films used on this package, there are various types of similar plastic heat-sealable films ranging in thicknesses from .00025 to .002 inch which may be used. Generally, these would have low moisture permeability, would be resistant to the adhesives in question and the solvents used for these adhesives would be flexible at a temperature ranging from normal ambient temperatures of the adhesive in question, perhaps below zero, to 125° F. Of course, with adhesives that cannot be subjected to freezing, low temperature characteristics need not be present.

The principal reason for these films is that they must be sufficiently strong, generally upward of 3,500 p.s.i. and perhaps as much as 7,000 to 20,000 p.s.i. In connection with one film, we may use "Saran," a copolymer of polyvinylidene chloride with small amounts of polyvinyl chloride. (See the Plastics Handbook Section of Scientific American, September 1957.) "Saran" is a thermoplastic material that may be used from .0005 to .002 inch in thickness and may be sealed at nominal temperatures, 280–300° F., with a mechanical strength of 7,000 to 15,000 p.s.i., and will have a relatively high bursting strength, exceptional toughness, a low moisture permeability, that is a water-vapor transmission vs. temperature which will generally be below 0.4 to 0.5 grams per 100 square inches per 24 hours, at 90 percent relative humidity. It will also have excellent chemical resistance to most acids, alkalis, essential oils and solvents, and a reasonably high drop impact strength so that it would be subject to normal handling and usage.

Cryovac, an irradiated and oriented polyethylene film manufactured by W. R. Grace & Co., has a thickness of from .0005 to .0013 inch, a tensile strength of from 8,000 to 16,000 p.s.i., heat sealing range of from 300 to 500° F., water-vapor permeability, grams per 24 hours per 100 square inches at 100° F. and 90 percent relative humidity of 0.6 to 0.7. It will have a maximum use temperature of 220° F. and a minimum use temperature of −60° F. with excellent resistance to storage at below 115° F.

Cellophane may also be used and comes in a great many varieties, one of which would have an approximate thickness of .001 to .0014 inch, would be moistureproof, heat sealing, water resistant, and suitable for wrapping products to protect them against water, oils and gases. Besides water resistance to withstand contact with wet products, the cellophone bags would be highly flexible and durable.

Mylar, a polyester film of Du Pont, has a range of thickness from 0.00025 to 0.010 inch, a tensile strength of 20,000 p.s.i., a melting point around 250° C., service temperature from −60° to 150° C. It has a moisture-vapor permeability of 100 grams per 100 meters per hour.

Teflon, a fluorocarbon film manufactured by Du Pont has an ultimate strength of 3,000 p.si., and a temperature range from −850° C. to 200° C. It is heat sealable but has a moisture-vapor transmission rate in grams per 100 m.$^2$ per hour, per mil, of 30. It comes in thickness ranges from .0005 to .04 inch.

All of these films may be used in connection with this adhesive package and they may be used in laminates of several of these films with other materials, foils, and other films in which the heat sealable film of plastic material is on the inside face.

In connection with FIG. 1, 10 shows a package of mastic or adhesive, 11 shows one end possibly heat sealed, and 12 shows the opposite end which may be heat sealed. The sides of the package shown at 13 would bulge and extend outwardly. Running longitudinally of the package would be a mark or indicia line 14, and extending along each end would be indicia lines 15 at one end and 16 at the opposite end. These indicia lines provide guide lines to cut and open the package to remove substantially all of the film from one surface so that the glob of one to three pounds may be secured to the surface and have the pliable sealant film removed from the opposite side.

This operation is explained in connection with FIG. 2 where a cut is made along end 11, cutting the indicia lines shown at 15, and a hook knife 17 is shown cutting the longitudinal indicia line 14.

The cutting continues along the indicia line 16 of the opposite end 12, and both flaps are removed so that the area is uncovered. The flaps are shown turned back, one flap being shown at 18 on the left and 19 on the right, and now the exposed side of mastic shown at 20 may be secured to a wall as shown in the fragmentary view of FIG. 3 at 21. Because of the firm adhesion of mastic or adhesive to the wall, the remaining portions of the pliable sealant film shown generally at 22 may be removed by tearing from the glob or mass of adhesive. A hand 23 is shown pressing against the rear side of the opened package to affix the exposed mastic securely to the wall.

In the next operation a trowel of special type shown at 24 would be manipulated to spread the material, said trowel having indentures or rectangular portions on the edge as at 25. This would spread the material in an even pattern with a series of rides to permit the application of wall tile or wall panel to the mastic surface. This operation is conventional in the trade.

In connection with FIG. 5 an alternate view of a package with indicia lines shown thereon is indicated. The indicia lines are shown at 26 along one side and are continued and connected thereto along another side substantially perpendicular thereto at 27, and continue along the opposite side as at 28.

It will be seen that other forms and markings could be indicated in which one or more lines extending substantially along the package and a number of lines in a direction perpendicular thereto would permit removal from all or part of one face of the adhesive so that the balance of the pliable sealant film may be removed.

These containers could be round, sausage-shaped, rectangular, or square, and the cutting or indicia lines could be substantially the length of the package in a spiral, and the lines transverse to the longitudinal line need not be exactly perpendicular thereto. It is sufficient to say that the flaps must be removed from the surface of the package so that a substantial area is exposed which may be forced against the surface, and the remaining portions of the pliable sealant film removed from the package. Even though a mass of one to three pounds of adhesive is applied in this manner, the film may be removed from the remainder of the package because of the great adhesive force of the mastic to the wall. Of course, it will be understood that under some conditions some of the mastic or the adhesive will adhere to the sealant film and there is a slight loss in the package unless efforts are made by means of slippery coatings to prevent this adhesion.

However, as will be noted in FIG. 3, flaps 18 and 19 provide a method by which the package material may be peeled away easily from the adhesive without direct contact being made by the hands of the operator to the adhesive mass. Also, once the pliable sealant film has been removed from the mastic mass, it may be discarded readily, thus avoiding the necessity for interim storage of the adhesive or mastic during use, as well as ultimate disposal or possible return of the container when empty.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

I claim:
1. A method of packaging, transporting, and applying a definite amount of a viscous adhesive material to a surface without manually contacting said material, which comprises (1) wrapping a prescribed amount of the adhesive material in a continuous plastic film having a thickness of about 0.00025 to 0.01 of an inch and a mechanical strength of about 3,500 p.s.i. to 20,000 p.s.i.; (2) sealing the ends of said plastic film with heat to enclose the material; (3) rupturing the plastic wrapper along predetermined lines to expose a substantial portion of the adhesive material and manually applying the exposed portion to the surface by slapping it against the surface; and (4) removing the plastic wrapper by peeling it away from the adhesive material; said adhesive material having an adhesive force to the surface greater than the forces of adhesion to the plastic wrapper and the force of gravity acting on the adhesive material; thereby permitting the plastic wrapper to be peeled from the adhesive material without breaking the bond between the adhesive material and the surface.

2. The method of claim 1 further characterized in that the plastic wrapper comprises a laminate of a pliable plastic film on the interior surface and a heavy wrapping material on the exterior surface.

3. The method of claim 1 further characterized in that the plastic film used for wrapping the adhesive material is polyethylene.

4. The method of claim 1 further characterized in that the plastic film used for wrapping the adhesive material is a polyester.

5. The method of claim 1 further characterized in that the plastic film used for wrapping the adhesive material is polytetrafluoroethylene.

6. The method of claim 1 further characterized in that the plastic film used in wrapping the adhesive material is cellulose acetate.

7. The method of claim 1 further characterized in that the plastic film used in wrapping the adhesive material is a copolymer of polyvinylidine chloride and polyvinyl chloride.

8. A method of packaging and applying to a building surface a definite amount of a viscous adhesive without manually contacting the adhesive which comprises (1) wrapping a prescribed amount of the adhesive in a continuous plastic film having a thickness of about 0.00025 to 0.002 of an inch and a mechanical strength of about 3,500 p.s.i. to 20,000 p.s.i.; (2) sealing the ends of said plastic film with heat at temperatures of about 280° F. to 500° F. to enclose the adhesive in the wrapper; (3) rupturing the plastic wrapper along predetermined lines to expose a substantial portion of the adhesive and manually applying the exposed portion to the building surface by slapping it against the surface; and (4) peeling the plastic wrapper from the adhesive; said adhesive having an adhesive force to the building surface greater than the forces of adhesion to the plastic wrapper and the forces of gravity acting on the adhesive; whereby the plastic wrapper is peeled from the adhesive without breaking the bond securing the adhesive to the building surface.

9. The method of claim 8 further characterized in that the plastic film used for wrapping the adhesive is a copolymer of polyvinylidene chloride and polyvinyl chloride.

10. The method of claim 6 further characterized in that the plastic film used for wrapping the adhesive is cellulose acetate.

References Cited in the file of this patent

UNITED STATES PATENTS

| | | |
|---|---|---|
| 2,547,487 | Penney | Apr. 3, 1951 |
| 2,596,179 | Seymour | May 13, 1952 |
| 2,608,503 | Meyer | Aug. 26, 1952 |
| 2,762,504 | Sparks et al. | Sept. 11, 1956 |

FOREIGN PATENTS

| | | |
|---|---|---|
| 456,471 | Great Britain | Nov. 10, 1936 |
| 571,322 | Great Britain | Aug. 20, 1945 |